United States Patent
Yen

(10) Patent No.: US 9,590,482 B2
(45) Date of Patent: Mar. 7, 2017

(54) MAGNETIC LEVITATION POWER DEVICE

(71) Applicant: Taiwan Energy Development Corp., Taichung (TW)

(72) Inventor: Wen-Tang Yen, Taichung (TW)

(73) Assignee: TAIWAN ENERGY DEVELOPMENT CORP., Taichung (TW)

( * ) Notice: Subject to any disclaimer, the term of this patent is extended or adjusted under 35 U.S.C. 154(b) by 388 days.

(21) Appl. No.: 14/341,020

(22) Filed: Jul. 25, 2014

(65) Prior Publication Data

US 2015/0340940 A1    Nov. 26, 2015

(30) Foreign Application Priority Data

May 21, 2014   (TW) .............................. 103117802 A

(51) Int. Cl.
| | |
|---|---|
| H02K 7/06 | (2006.01) |
| H02K 47/04 | (2006.01) |
| F16H 1/20 | (2006.01) |
| F16H 57/00 | (2012.01) |
| F16C 32/04 | (2006.01) |
| H02K 7/116 | (2006.01) |
| H02K 53/00 | (2006.01) |

(52) U.S. Cl.
CPC ......... *H02K 47/04* (2013.01); *F16C 32/0427* (2013.01); *F16H 1/206* (2013.01); *F16H 57/0018* (2013.01); *H02K 7/116* (2013.01); *H02K 53/00* (2013.01); *Y10S 74/09* (2013.01)

(58) Field of Classification Search
CPC ........ H02K 53/00; H02K 47/00; H02K 7/116; H02K 7/09; H02K 7/025
USPC ................... 310/83, 98–99, 90.5; 74/DIG. 9
See application file for complete search history.

(56) References Cited

U.S. PATENT DOCUMENTS

| | | | | |
|---|---|---|---|---|
| 3,757,149 A * | 9/1973 | Holper | .................. | H02K 17/10 310/114 |
| 4,569,828 A * | 2/1986 | Nishizawa | .............. | C30B 15/30 117/201 |
| 5,495,221 A * | 2/1996 | Post | .................... | F16C 32/0408 310/90.5 |
| 6,285,103 B1 * | 9/2001 | Fukada | .................... | H02K 7/18 310/152 |
| 6,940,194 B1 * | 9/2005 | Lauk | ....................... | H02K 1/17 310/154.01 |

\* cited by examiner

*Primary Examiner* — Thanh Lam
(74) *Attorney, Agent, or Firm* — Raymond Y. Chan; David and Raymond Patent Firm

(57) ABSTRACT

A magnetic levitation power device is revealed. The magnetic levitation power device includes at least two sets of power devices, a motor, and a power generator. The magnetic levitation power device features on the power devices each of which consists of a first seat, a second seat and a transmission set. A first sleeve is set on the first seat and a second sleeve is arranged at the second seat. The transmission set is composed of a shaft, a large gear and a small gear. Each of two ends of the shaft are disposed with two magnetic bodies respectively and are mounted in a sleeve. The magnetic bodies are arranged with like poles repel each other so that the transmission set is suspended and friction coefficient of the shaft is reduced. Therefore high speed transmission is achieved by low power to get high power.

5 Claims, 4 Drawing Sheets

MAGNETIC LEVITATION POWER DEVICE

BACKGROUND OF THE INVENTION

Fields of the Invention

The present invention relates to a magnetic levitation power device, especially to a magnetic levitation power device in which power devices are suspended due to magnetic repulsion. Thus high energy is obtained by minimum energy input.

Descriptions of Related Art

Earth's natural resources are limited. The non-renewable natural resources used for power generation will be exhausted sooner or later. Some other energy resources for power generation available now such as nuclear energy have problems of storage of radioactive waste, harmful nuclear radiation, etc. Thus development of renewable energy alternatives such as solar energy, wind power, hydroelectric power is gradually becoming a major concern now. However, all these alternatives have problems of high cost in manufacturing or maintenance or other shortcomings.

There are many devices designed base on magnetic repulsion available now. A part of these devices focused on that power is permanent and everlasting. Yet such devices haven't been applied to power generation now.

There is room for improvement and a need to provide a power generation system designed based on magnetic repulsion and having high transmission efficiency. Maximum energy is generated by minimum energy input in the system. No heat, carbon dioxide and toxic materials are generated. The device is not affected by weather or the environment. Most important of all, the device is an environmental friendly energy generating device with low cost and no pollution.

SUMMARY OF THE INVENTION

Therefore it is a primary object of the present invention to provide a magnetic levitation power device that generates high power by a low-power activated motor.

In order to achieve the above object, a magnetic levitation power device of the present invention includes at least two sets of power devices, a motor, and a power generator. Each of the power devices consists of a first seat, a second seat and a transmission set. The first seat is set with a first sleeve and the second seat is arranged with a second sleeve. Both the first sleeve and the second sleeve have a hollow space for receiving other parts. A bottom end of the hollow space of the first sleeve and a bottom end of the hollow space of the second sleeve are disposed with a first lower magnetic body and a second lower magnetic body respectively. The transmission set is composed of a shaft, a large gear and a small gear. The shaft has a first end and a second end that are disposed with a first upper magnetic body and a second upper magnetic body respectively. The first end and the second end are mounted and stopped in the first sleeve and the second sleeve respectively while the first sleeve and the second sleeve are sealed by a cover respectively. The first upper magnetic body and the first lower magnetic body are arranged with like poles facing each other and so are the second upper magnetic body and the second lower magnetic body. Due to like poles repel each other, the shaft is suspended and friction coefficient of the shaft is reduced during transmission. A middle part of the shaft is disposed with the large gear and the small gear. A counterweight part is set on an edge of a periphery of the large gear. A diameter ratio of the small gear to the large gear is about 1:3.

There are at least two sets of power devices. A large gear of a first power device and a small gear of a second power device are meshed together while a large gear of the second power device is engaged with a small gear of a third power device.

The driving pattern of the magnetic levitation power device is described as following. In the beginning, a low-speed motor outputs a driving force while a shaft of the motor is disposed with a large gear. By the driving force, the large gear of the motor initially turns the small gear of the first power device and then the large gear of the first power device drives the small gear of the second power device. The large gear of the second power device is engaged with the small gear of the third power device so that the driving continues. At last, the large gear of the third power device turns the small gear of the power generator to rotate. Thus the low speed motor activated by low power turns the power devices to rotate at high speed by gear radio. Therefore the power generator of the magnetic levitation power device gets high power.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
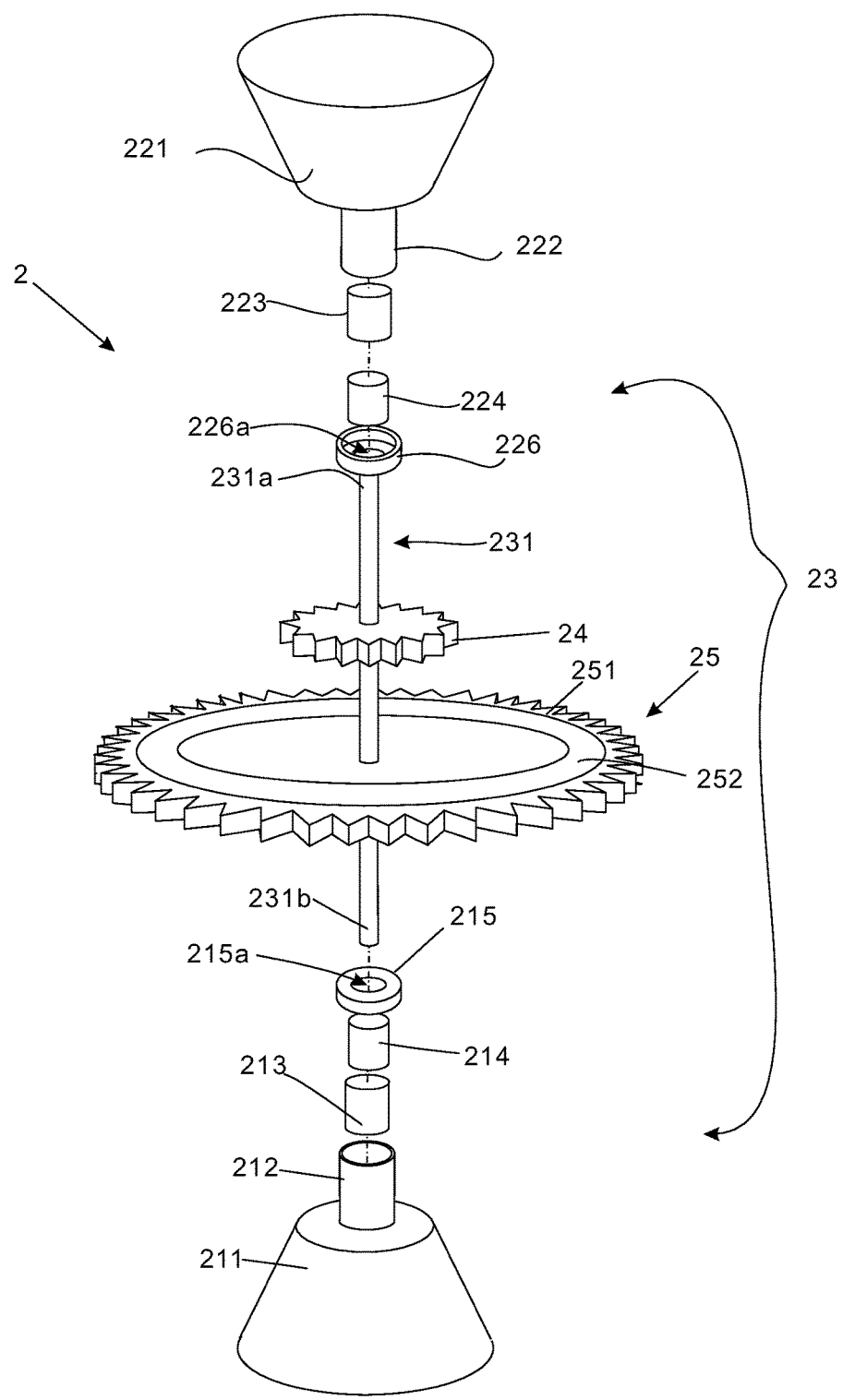
FIG. 1 is an explosive view of an embodiment according to the present invention.

Refer from FIG. 1 to FIG. 4, a magnetic levitation power device of the present invention includes a motor 1, at least two sets of power devices 2, and a power generator 3. The motor 1 includes a transmission shaft 1a disposed with a large gear 11 while a transmission shaft 3a of the power generator 3 is arranged with a small gear 31. As shown in FIG. 1, the power device 2 consists of a first seat 221, a second seat 211 and a transmission set 23. A first sleeve 222 is set on the first seat 221 and a second sleeve 212 is arranged at the second seat 211. The first sleeve 222 and a second sleeve 212 are hollow tubes used for receiving other parts. A bottom end of the first sleeve 222 and a bottom end of a second sleeve 212 are disposed with a first lower magnetic body 223 and a second lower magnetic body 213 respectively. Both the first and the second lower magnetic bodies 223, 213 are fixed firmly. As to the transmission set 23, it is composed of a shaft 231, a large gear 25 and a small gear 24. The shaft 231 has a first end 231a and a second end 231b. The first end 231a is closely connected to a first upper magnetic body 224 while the second end 231b is tightly connected to a second upper magnetic body 214. The first upper magnetic body 224 and the second upper magnetic body 214 are mounted into the first sleeve 222 and the second sleeve 212 respectively. That means the first end 231a and the second end 231b of the shaft 231 are also mounted in the first sleeve 222 and the second sleeve 212.

Then the first sleeve 222 and the second sleeve 212 are sealed by a cover 226 and a cover 215 respectively. Thus the first end 231a and the second end 231b of the shaft 231 are stopped in the first sleeve 222 and the second sleeve 212. One end of the first upper magnetic body 224 and one end of the first lower magnetic body 223 facing each other are arranged with like poles symmetrically. Similarly, one end of the second lower magnetic lower body 213 and one end of the second upper magnetic body 214 facing each other are disposed with like poles symmetrically. Thus the shaft 231 is suspended due to like poles repel each other so as to reduce friction coefficient of the shaft 231 during rotation. A middle part of the shaft 231 is disposed with the large gear 25 and the small gear 24 while a diameter ratio of the small gear 24 to the large gear 25 is about 1:3. This is only an embodiment of the present invention to describe the size of the large gear and the size of the small gear. A counterweight part 252 is set on an edge of a periphery 251 of the large gear 25.

Figure 3:
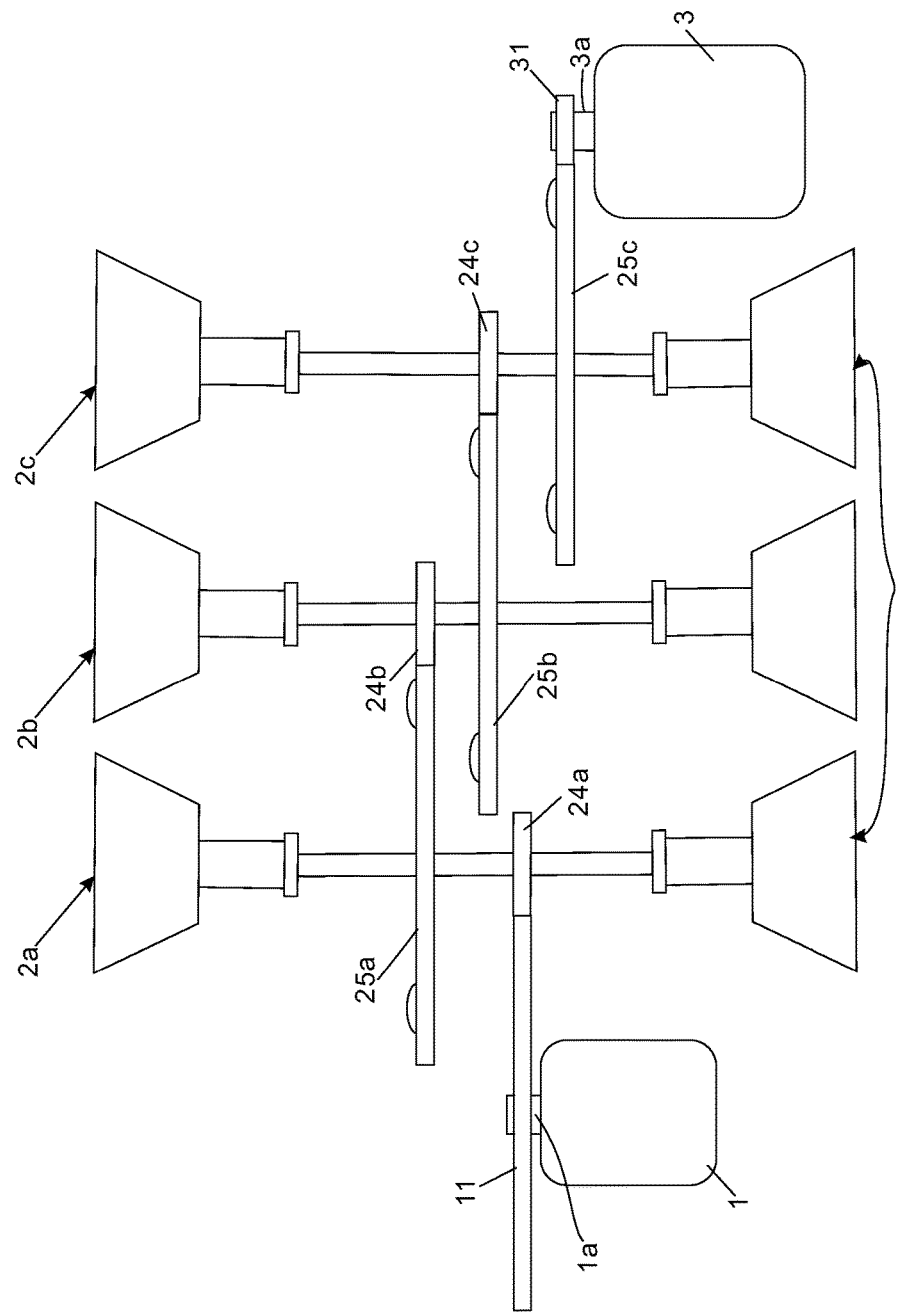
FIG. 3 is a schematic drawing showing power driving pattern of an embodiment according to the present invention.

As shown in FIG. 3, there are three power devices 2 in this embodiment. A large gear 25a of a first power device 2a is engaged with a small gear 24b of a second power device 2b while a large gear 25b of the second power device 2b and a small gear 24c of a third power device 2c are meshed together. This is the main driving mechanism of the magnetic levitation power device of the present invention. There is no limit on the number of the power device 2. There can be four, five or even more sets of power devices 2. With more sets of power devices 2, a larger driving force rotating at a higher speed is obtained. And the power generator 3 receives more energy. The ratio of the number of teeth on the large gear 11 of the motor 1 to the number of teeth on the small gear 24a of the first power device 2a is 3:1. However, this is only an embodiment of the present invention, not intended to limit the ratio of the number of the teeth on the large gear to that on the small gear. In an embodiment of the present invention, the ratio of the number of teeth on the small gear 31 of the power generator 3 to the number of teeth on the large gear 25c of the third power device 2c is about 1:3.

The driving pattern of the magnetic levitation power device is described in details as following. First the motor 1 provides an initial driving force to the power device 2. The large gear 11 of the motor 1 initially turns the small gear 24a of the first power device 2a and then large gear 25a of the first power device 2a drives the small gear 24b of the second power device 2b. At the same time, the large gear 25b of the second power device 2b turns the small gear 24c of the third power device 2c. At last, the large gear 25c of the third power device 2c drives the small gear 31 of the power generator 3 to rotate. The power device 2 rotates multiple times faster due to the ratio of the number of the teeth on the gear (gear ratio/speed ratio). For example, the first power device 2a is connected to the second power device 2b while the second power device 2b turns several times faster than the speed of the first power device 2a. The second power device 2b is connected to the third power device 2c. Similarly, the third power device 2c rotates multiple times faster than the speed of the second power device 2b. The rotational speed of the small gear 31 of the power generator 3 driven by the third power device 2c is also increased. That means the first power device 2a driven by the motor 1 turns at a lower speed in the beginning. Through the second power device 2b connected to the first power device 2a and the third power device 2c connected to the second power device 2b, the power is transferred from one power device to another to increase the speed of rotation. The lower speed of rotation is increased to a higher speed of rotation due to the ratio of the teeth on the gears driven by one another. Thus the power generator 3 has received higher power. Such magnetic levitation power device is one of the features of the present invention.

Figure 2:
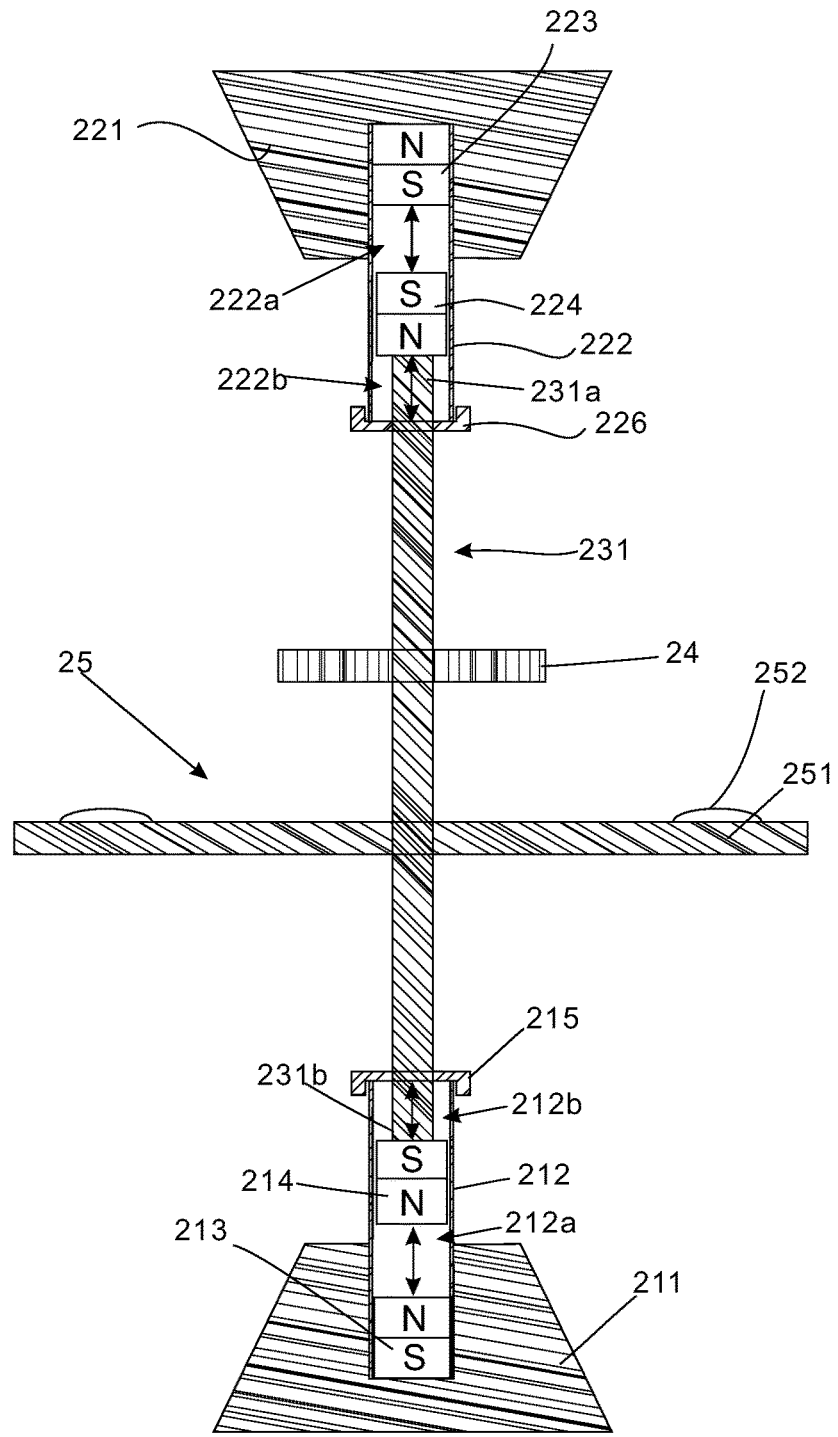
FIG. 2 is a cross sectional view of an assembled embodiment according to the present invention.

Another feature, the most important feature of the present invention is that the two ends 231a, 231b of the shaft 231 of the transmission set 23 of the power device 2 are disposed with the first upper magnetic body 224 and the second upper magnetic body 214 respectively. The first upper magnetic body 224 and the first lower magnetic body 223 are arranged with like poles facing each other and so are the second upper magnetic body 214 and the second lower magnetic body 213 respectively. Due to that the first upper magnetic body 224 and the lower magnetic body 223 with like poles repel each other, the second upper magnetic body 214 and the second lower magnetic body 213 with like poles repel each other, the two ends 231a, 231b of the shaft 231 are magnetically suspended in the sleeves respectively, as shown in FIG. 2. A space between the first upper magnetic body 224 and the first lower magnetic body 223 and a space between the second upper magnetic body 214 and the second lower magnetic body 213 are first space 222a, 212a with zero-gravity respectively. Moreover, the first upper magnetic body 224 and the second upper magnetic body 214 are axially stopped in the sleeves 222, 212 respectively. There are second space 212b, 222b between the second upper magnetic body 214 and the cover 215, and between the first upper magnetic body 224 and the cover 226 respectively. That means both the first upper magnetic body 224 and the first lower magnetic body 223 on one end of the shaft 231 are with like poles and repel each other to be mounted and levitated in the first sleeve 222. And so are the second upper magnetic body 214 and the second lower magnetic body 213 on the other end of the shaft 231 mounted and levitated in the second sleeve 212. In other words, the shaft 231 of the transmission set 23 rotates between the first seat 221 and the second seat 211 in the levitated manner. The shaft 231 is inserted through holes 215a, 226a preset on the covers 215, 226 respectively so that the first end 231a and the second end 231b are mounted in the first sleeve 222 and the second sleeve 212 respectively. Then the first upper magnetic body 224 and the second upper magnetic body 214 are tightly fastened to the first end 231a and the second end 231b by screws respectively. That means the transmission set 23 is stopped between the first seat 221 and the second seat 211 without bearings. Thus rotational resistance of the transmission set 23 is reduced. Furthermore, the first space 222a, 212a provides sufficient space for vibration during rotation of the shaft 231. And the shaft 231 is magnetically suspended. Thus the shaft 231 will not be affected by vibration caused by transmission and impact between the large gears and the small gears. Therefore the shaft 231 rotates stably at high speed. As to the counterweight part 252 around the edge of the periphery 251 of the large gear 25, it makes the large gear 25 have a centripetal force while rotating at high speed. Thus the shaft 231 rotating at high speed is accelerated to have larger power output.

Figure 4:
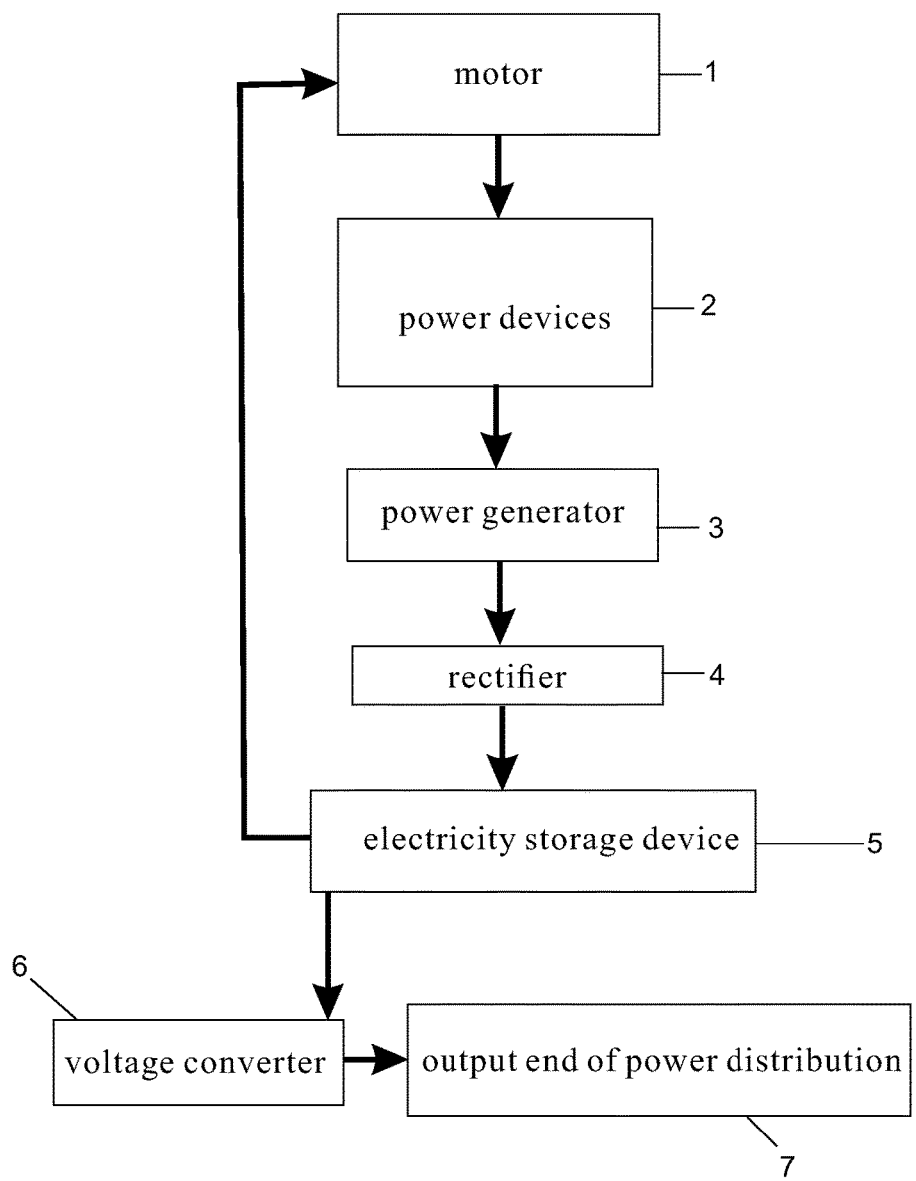
FIG. 4 is a flow chart showing how a power generator of an embodiment according to the present invention works.

In addition, how the power generator 3 of the magnetic levitation power device of the present invention works is shown in FIG. 4. First the motor 1 turns on the power devices 2 to rotate at high speed. Then the power generator 3 is driven by the high-speed rotating power devices 2 to produce power. Next the power generated is passed through a rectifier 4 to be stored in an electricity storage device 5. Then current from the electricity storage device 5 is passed through a voltage converter 6 so as to convert DC (direct current) power into AC (alternating current) power. At last the AC power is transmitted to users' end through an output end of power distribution 7. It should be noted that a power source of the motor 2 in the beginning is the electricity storage device 5. And the following power supply of the motor 1 is a part of the power generated by the above flow chart and stored in the electricity storage device 5.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic levitation power device comprising a motor providing an initial driving force, at least two sets of power devices driven by the initial driving force of the motor, and a power generator turned by the power devices;

wherein the power device includes a first seat, a second seat and a transmission set; the first seat is disposed with a first sleeve and the second seat is arranged with a second sleeve; the transmission set having a shaft, a large gear and a small gear while the large gear and the small gear are disposed on the shaft; the shaft having a first end and a second end; the first end is connected to a first upper magnetic body and mounted into a first sleeve; the second end is connected to a second upper magnetic body and mounted into a second sleeve; the first end and the second end are sealed and stopped in the first sleeve and the second sleeve by a cover respectively; a first lower magnetic body and a second lower magnetic body are fixed in a bottom end of the first sleeve and a bottom end of the second sleeve respectively; the first upper magnetic body and the first lower magnetic body are arranged with like poles facing each other; the second upper magnetic body and the second lower magnetic body are disposed with like poles facing each other; due to the like poles repel each other, a first space is formed between the first end of the shaft and the first lower magnetic body, and between the second end of the shaft and the second lower magnetic body; the shaft of the transmission set rotates between the first seat and the second seat in a levitated manner.

2. A magnetic levitation power device comprising a power device module, a motor providing an initial driving force to drive the power device module, and a power generator turned by the power device module;

wherein the power module includes at least three power devices—a first power device, a second power device, and a third power device; each of the power devices having a first seat, a second seat and a transmission set; the first seat is disposed with a first sleeve and the second seat is arranged with a second sleeve; the transmission set includes a shaft, a large gear and a small gear while the large gear and the small gear are disposed on the shaft; wherein a first lower magnetic body and a second lower magnetic body are mounted in a bottom part of the first sleeve and a bottom part of the second sleeve respectively; the shaft having a first end and a second end; the first end is connected to a first upper magnetic body and mounted into a first sleeve; the second end is connected to a second upper magnetic body and mounted into a second sleeve; the first end and the second end are sealed and stopped in the first sleeve and the second sleeve by a cover respectively; the first upper magnetic body and the first lower magnetic body are arranged with like poles facing each other; the second upper magnetic body and the second lower magnetic body are disposed with like poles facing each other; the shaft of the transmission set rotates between the first seat and the second seat in a levitated manner; wherein a large gear of the first power device drives a small gear of the second power device and simultaneously a large gear of the second power device turns a small gear of the third power device; at last, a large gear of the third power device drives a small gear of the power generator to rotate; by a ratio of the number of teeth of the large gear of the power device to the number of teeth of the small gear of the power device and the number of teeth of the small gear of the power generator, each power devices rotates faster than the previous power device and the small gear of the power generator is driven to rotate multiple times faster so as to obtain power.

3. The device as claimed in claim 2, wherein the number of the power devices is increased or decreased according to size of the power generator.

4. The device as claimed in claim 2, wherein a counterweight part is disposed around the large gear; disposition of the counterweight part makes the large gear have a centripetal force while rotating so that the rotating shaft is accelerated to have power output.

5. A magnetic levitation power device comprising: at least two sets of power devices, a motor, a power generator, a rectifier, an electricity storage device, and a voltage converter; wherein the motor first turns on the power devices to rotate and the power generator is driven by power devices to produce power; then the power generated is passed through the rectifier to be stored in the electricity storage device; next a current from the electricity storage device is passed through the voltage converter so as to convert DC (direct current) power into AC (alternating current) power; at last the AC power is transmitted to users' end through an output end of power distribution; a power the motor required comes from the electricity storage device and following power supply of the motor is a part of the power generated mentioned above and stored in the electricity storage device.

* * * * *